SYSTEM FOR THE CONTROL OF PARAMETRIC OSCILLATIONS

Filed May 7, 1964

INVENTOR.
GEORGE H. BARNES
BY Francis A. Varallo
AGENT

INVENTOR.
GEORGE H. BARNES
BY Francis A. Varallo
AGENT

Jan. 7, 1969 G. H. BARNES 3,421,017

SYSTEM FOR THE CONTROL OF PARAMETRIC OSCILLATIONS

Filed May 7, 1964 Sheet 3 of 3

INVENTOR
GEORGE H. BARNES

BY Francis A. Varallo
AGENT

United States Patent Office
3,421,017
Patented Jan. 7, 1969

3,421,017

SYSTEM FOR THE CONTROL OF PARAMETRIC OSCILLATIONS

George H. Barnes, West Chester, Pa., assignor to Burroughs Corporation, Detroit, Mich., a corporation of Michigan Filed May 7, 1964, Ser. No. 365,664
U.S. Cl. 307—88 8 Claims
Int. Cl. H03k *17/60*

ABSTRACT OF THE DISCLOSURE

The present disclosure describes a system for the cyclic excitation of a plurality of parametrons wherein the initiation and subsequent termination of parametric oscillations is performed by gated transistor current drivers which selectively provide a first amplitude of DC bias required for oscillations and a second amplitude of DC bias, which is preferably greater than that required for oscillations and at which latter amplitude oscillations do not occur.

The present invention relates generally to parametrically excited resonant devices, hereinafter referred to as parametrons, and more specifically to an improved system for the cyclic excitation of a plurality of parametrons, in which the excitation of each parametron is interrupted periodically in regular clock cycles.

The principles of parametron operation are presently well known to those skilled in the art and are described in detail in a publication authored by Eiichi Goto entitled, "The Parametron, a Digital Computing Element Which Utilizes Parametric Oscillation," and appearing in the Proceedings of the IRE, vol. 47, No. 8, August 1959. A further description of parametron devices and systems is found in U.S. Patent No. 2,948,818 issued on Aug. 9, 1960, in the name of Eiichi Goto.

Briefly, the basic parametron comprises a resonant circuit including a parallel inductance and capacitance, tuned by appropriate wiring and selection of components to a desired frequency. One of the circuit components, either the inductance or the capacitance, is nonlinearly variable. When an excitation current alternating at a radio frequency (R.F.) twice that of the tuned resonant frequency of the parametron together with a DC bias current are applied to the variable component, the reactance of this component is pumped or varied with the excitation, causing the parametron to oscillate at half the frequency of the excitation current.

The parametron is thus a phase-locked subharmonic oscillator in which the relative phase angle of the oscillation, either 0° or 180°, is employed to represent binary information. The phase of the oscillation can be selected by the application of a small control or information-input signal to the resonant circuit in the early stages of its oscillation. Such an input signal produces a small initial oscillation in the parametron which serves as a seed or nucleus for determining the phase state of the parametron when it is in the active or excited condition.

The biphase subharmonic oscillation of parametrons allows the use of combinations of such devices to perform data storage and processing functions. In such operation, the parametrons are often connected in cascade, with the output signal of one parametron serving as the control input signal of the next parametron. Since the parametron is a two-terminal device, unilateral information flow is generally based upon a three-phase clock cycle, also referred to as three-beat excitation. Thus, each of the parametrons will be excited once in every clock cycle, at a definite time. In a system employing parametrons, the elements are arranged in three groups, I, II, III, corresponding respectively to the phases of the clock cycle. All of the parametrons in the first group (I) are simultaneously excited into oscillation by the alternating pump current excitation of the first clock phase; the second group (II), during the second phase; the third group (III), during the third phase. The excitation periods of the three clock phases are chosen to overlap one another to permit the transfer of information between parametrons of "adjacent" groups such as from Group I to Group II, Group II to Group III, Group III to Group I. During a given clock period, a particular parametron is either receiving information, transmitting information, or is inactive, that is, not oscillating. Information is transferred by influencing an inactive parametron with a low-amplitude signal of frequency, $f$, which may be a portion of the oscillation current from one or more active donor parametrons belong to the preceding phase group. Following receipt of this small "seed" signal, the AC pump excitation current of frequency $2f$ initiates oscillation in the receiver parametron. The phase state of this oscillation is the same as, and is determined by, the input phase from the donor parametron and the oscillation continues in this state until the excitation current is terminated. Thus one parametron element may be controlled by the oscillation of another, and information may be readily transferred from element to element. Basic logic functions such as AND and OR, together with more complex functions may be simply mechanized by parametrons operating in a majority mode. Thus, the majority phase of an odd number of inputs from donor parametrons will determine the resultant phase of the receiving parametron.

As discussed hereinbefore, the operation of a parametron system entails the cyclic excitation of groups of parametrons. In the prior art system taught in the referenced publication and patent of Eiichi Goto, the cyclical energization of the group of parametrons is accomplished by modulating the radio-frequency excitation current. These systems utilize separate sources of AC pump power, synchronized with and driven by a master oscillator generating the $2f$ pump frequency.

Each of the sources is associated with a group of parametrons. Switching circuits are required for turning the AC power sources on and off at different overlapping time periods to define the respective groups of excitation signals applied to the groups of parametrons.

Casual mention is made in the referenced patent regarding oscillation and the interruption thereof as being effected by the control of the exciting circuit "(such as make and break of the switch, the variation of bias voltage and the variation of frequency)." However, the prior art references contain no teaching of the specific details of the present invention as described and claimed herein.

The present invention contemplates the use of a single continuously operating pump power source, together with a plurality of DC bias sources associated respectively with the groups of parametrons in the system. In accordance with the present invention, the oscillations of the parametrons are initiated and subsequently terminated by changing the normal amplitude of the parametron operating point DC bias to a value either above or below that required for oscillations. The DC bias determines both the constant and varying portions of the variable nonlinear component of the parametron resonant circuit. Therefore, the change between the conditions for oscillation and for no oscillations is much more abrupt than with AC modulation and the rise and fall times of the oscillation waveform are significantly less in the present system. While the prior art parametron system uses a plurality of separately modulated pump power sources, the present invention comprises a single continuous pump power source and several bias sources. The latter sources are pulsed at different and overlapping times, but control of these sources is much more efficient and reliable than similar control of individual sources of high-frequency pump power. Moreover, in the present system, there is no possibility of excitation current phase shift over the phases of a particular clock cycle.

It is therefore a general object of the present invention to provide an improved parametron system.

Another object of the present invention is to provide a parametron system in which the excitation of the parametron elements is accomplished with efficiency of excitation power, economy of peripheral equipment, and increased system reliability.

A further object of the present invention is to provide a cyclic excitation method for use in a parametron system, which method utilizes a single continuous operating source of pump power in place of the prior art plurality of modulated high frequency pump power sources.

A more specific object of the present invention is to provide a parametron system in which the cyclic excitation of the parametron elements is accomplished by changing the level of the DC bias to a value above or below the normal operating value required for oscillation, while concurrently suppyling a continuous radio-frequency current to all of said parametron elements.

These and other features of the invention will become more fully apparent from the following description of the annexed drawings, wherein.

Figure 1:
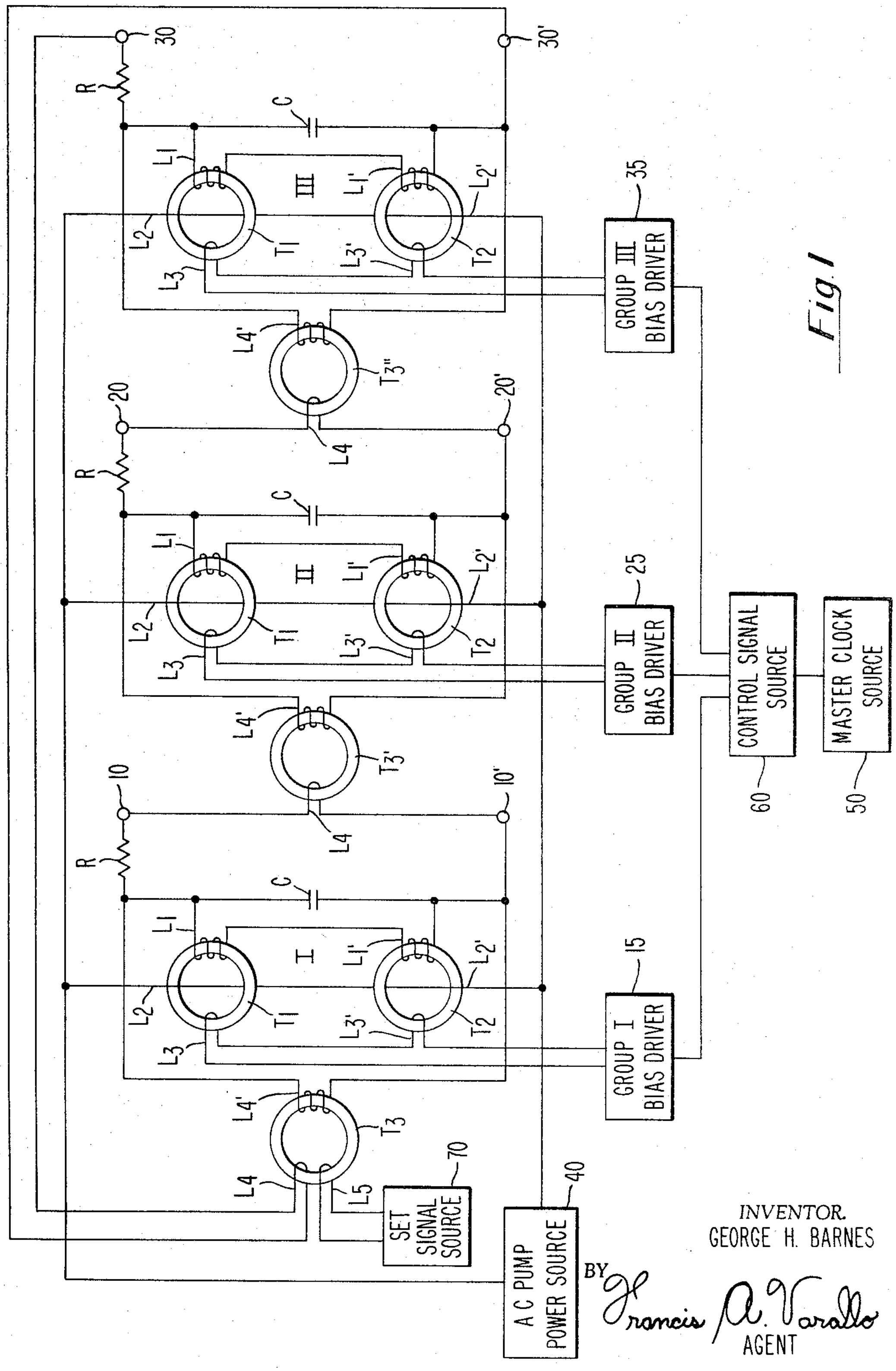
FIG. 1 is a representation of three prior art parametron elements arranged in a ring configuration, together with auxiliary equipment, for illustrating the present invention.

Referring to FIG. 1 there are shown three parametrons designated respectively by the Roman numerals I, II and III. These parametrons are of the variable-inductance type described in the aforementioned publication and patent. Each of the parmetrons comprises a resonant circuit tuned to frequency $f$ and consisting of a fixed capacitor C and a first pair of windings $L_1$ and $L_{1'}$ coupled respectively to two ferrite toroidal cores $T_1$ and $T_2$. In accordance with the illustrative embodiment of the present invention shown in FIG. 1, the excitation current of radio frequency $2f$, is applied from source 40 concurrently to second windings $L_2$ and $L_{2'}$ which link all of the cores in the resonant circuits. The latter windings are placed on the cores of each parametron in series opposition in order to prevent the direct transformation of the $2f$ frequency component of the excitation current into the resonant circuit. A third pair of windings $L_3$ and $L_{3'}$ linking the respective toroids $T_1$, $T_2$ of each parametron and wound in the same manner as the second AC pump windings, are connected to individual bias drivers. In practice each of the bias drivers, 15, 25, 35 are further designated according to the group of parametrons which it drives although in the circuit of FIG. 1, there is only one parametron in each group.

A portion of the oscillation of each donor parametron is coupled to the succeeding receiver parametron by means of a resistor R and windings $L_4$ and $L_{4'}$, inductively coupled to a transformer such as $T_3$, $T_{3'}$ or $T_{3''}$.

It should be understood that the excitation scheme of the present invention is not limited to the paricular physical configuration of the parametron element depicted in FIG. 1. The principles described and claimed herein are applicable to variable capacitance-type parametrons as well as other variable inductance types which utilize tape-wound cores, Twistors, electroplated wires and magnetic thin films as the inductor component.

With continued reference to FIG. 1, the parametrons I, II and III are arranged in a ring configuration, with the output of each parametron coupled to the succeeding one. For example, the output of III is coupled back to I. Because of the intermittent excitation in parametron operation, the three parametrons illustrated, store a single bit of information. Three beat or three sub-clock excitation is employed to transfer the bit of information from one parametron to the next. The triplet of parametrons illustrated in FIG. 1, may circulate a binary "1" and serve as a phase reference or standard for the other parametrons in a system. Such a standard is necessary since the distinction between binary "0" and "1" in a parametron circuit is a relative concept and is only determined by comparison with the established oscillation phase of the "constant" parametrons in the ring.

The inductance of windings $L_1$ and $L_{1'}$ of each of the parametrons of FIG. 1 is directly dependent upon the permeability of the ferrite material of cores $T_1$ and $T_2$ respectively. Such core material possesses a nonlinearly variable permeability. The application of a DC bias current to the core material in such a way as to induce a magnetic field therein, and of sufficient amplitude to bias the material into the nonlinear portion of the magnetic hysteresis loop, usually near saturation, together with the concurrent application of an AC pump current of frequency $2f$, will cause the parametron to oscillate at a frequency, $f$.

In the prior art systems, referenced herein, the AC pump current was superimposed on the operating-point DC bias current and both currents were passed through a single winding coupled to each of the resonant circuit cores.

In the present arrangement, the AC pump current is applied continuously to windings $L_2$ and $L_{2'}$ while the pulsed bias current derived from a bias driver, flows through separate windings $L_3$ and $L_{3'}$. It is the function of the bias driver to provide at predetermined times, the proper value of bias current to activate the parametrons with which it is associated, and at other times, a level of bias current, either greater or less than that needed to cause oscillations. These latter currents have the effect of shifting the operating point of the parametron inductor away from the optimum nonlinear region required for oscillation.

Figure 2A:
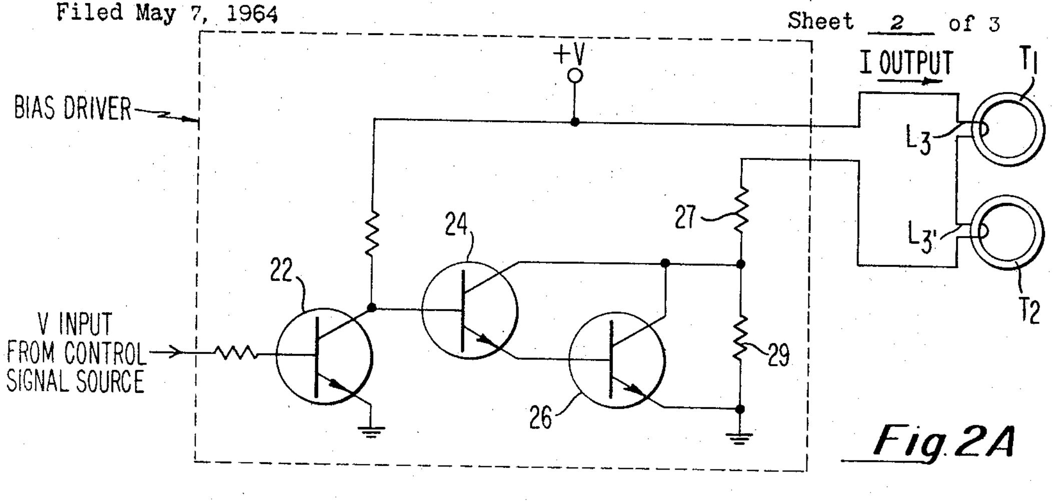
FIG. 2A is a schematic diagram of a pulse bias driver suitable for use in the system of FIG. 1.
Figure 2B:
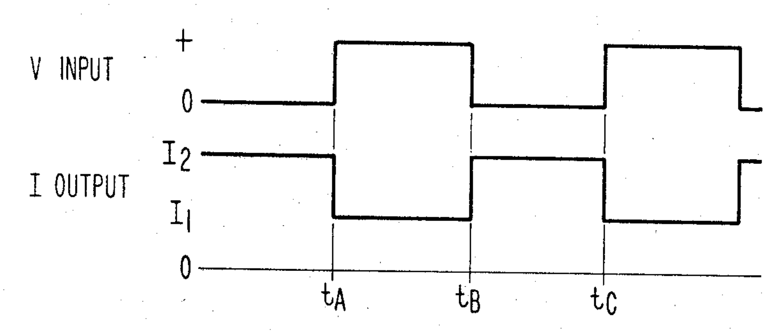
FIG. 2B is a diagram illustrating the relationship of the pulse input voltage to the pulse output current of the bias driver of FIG. 2A.

FIG. 2A depicts a simple bias driver that may be employed to provide different levels of the bias current, I output, to windings $L_3$ and $L_{3'}$. FIG. 2B shows the timing relationship of the V input pulse applied to the driver, to the output currents, designated $I_1$ and $I_2$.

In the bias driver operation, at time $t_A$, a positive voltage pulse V input from the control signal source, 60 (FIG. 1), is applied to transistor 22, to initiate the active cycle of the parametron. It is assumed that the AC pump current is flowing. Transistor 22, which had been nonconducting, is turned ON, and transistors 24 and 26 which had been conducting prior to time $t_A$, are turned OFF. The I output current, flowing through windings $L_3$ and $L_{3'}$ of the parametron has a level determined by the series impedances 27 and 29. This latter current level, designated $I_1$ in FIG. 2B, is that required for biasing the parametron to oscillation.

At time $t_B$, the positive voltage pulse input to the bias device terminates. Transistor 22 is turned OFF; transistors 24 and 26, ON. The conduction of the latter pair of transistors effectively short circuits impedance 29 and the I output current rises to the $I_2$ bias level as a function of impedance 27. This higher current amplitude tends to magnetically saturate the core material of the parametron and thereby shifts the operating point of the parametron to a nonoscillatory condition. At $t_C$, a positive pulse is again applied to transistor 22, as at time $t_A$, and the cycle is repeated.

Figure 3B:
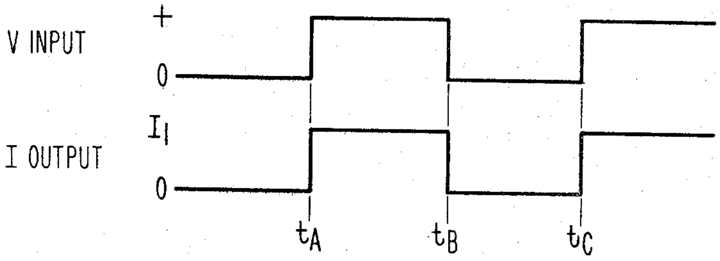
FIG. 3B illustrates the input voltage pulse and corresponding output current pulse provided by the circuit of FIG. 3A.
Figure 3A:
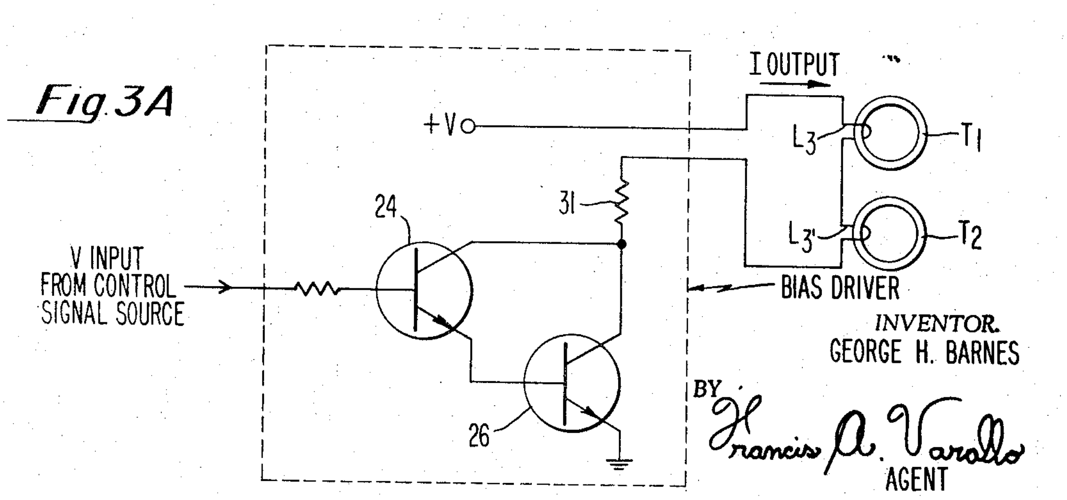
FIG. 3A depicts a simple circuit modification of the bias driver of FIG. 2A.

Alternatively, the circuit of FIG. 3A may be employed as a bias driver. FIG. 3B depicts the pertinent voltage and current waveforms. At time $t_A$, the V input turns transistors 24 and 26 ON, and current I output flows through windings $L_3$ and $L_{3'}$, as a function of impedance 31. This current level, $I_1$ in FIG. 3B, will permit oscillations in the parametron.

At time $t_B$, the voltage input to transistor 24 from the control signal source terminates. Transistors 24 and 26 are turned OFF, eliminating the current path from source +V through windings $L_3$ and $L_{3'}$ to ground. Thus current $I_1$ falls to a zero level, and the parametron deprived of its DC bias, ceases to oscillate. At time $t_C$, the active portion of the cycle is again initiated.

It must be emphasized that the circuit configurations of FIGS. 2A and 3A, for a bias driver as required in FIG. 1, are included solely for purpose of example. Numerous other circuit configurations well known to those skilled in the art, could be employed with satisfactory results. Accordingly, the present invention should in no way be considered limited to the use of the bias drivers described herein.

Figure 4:
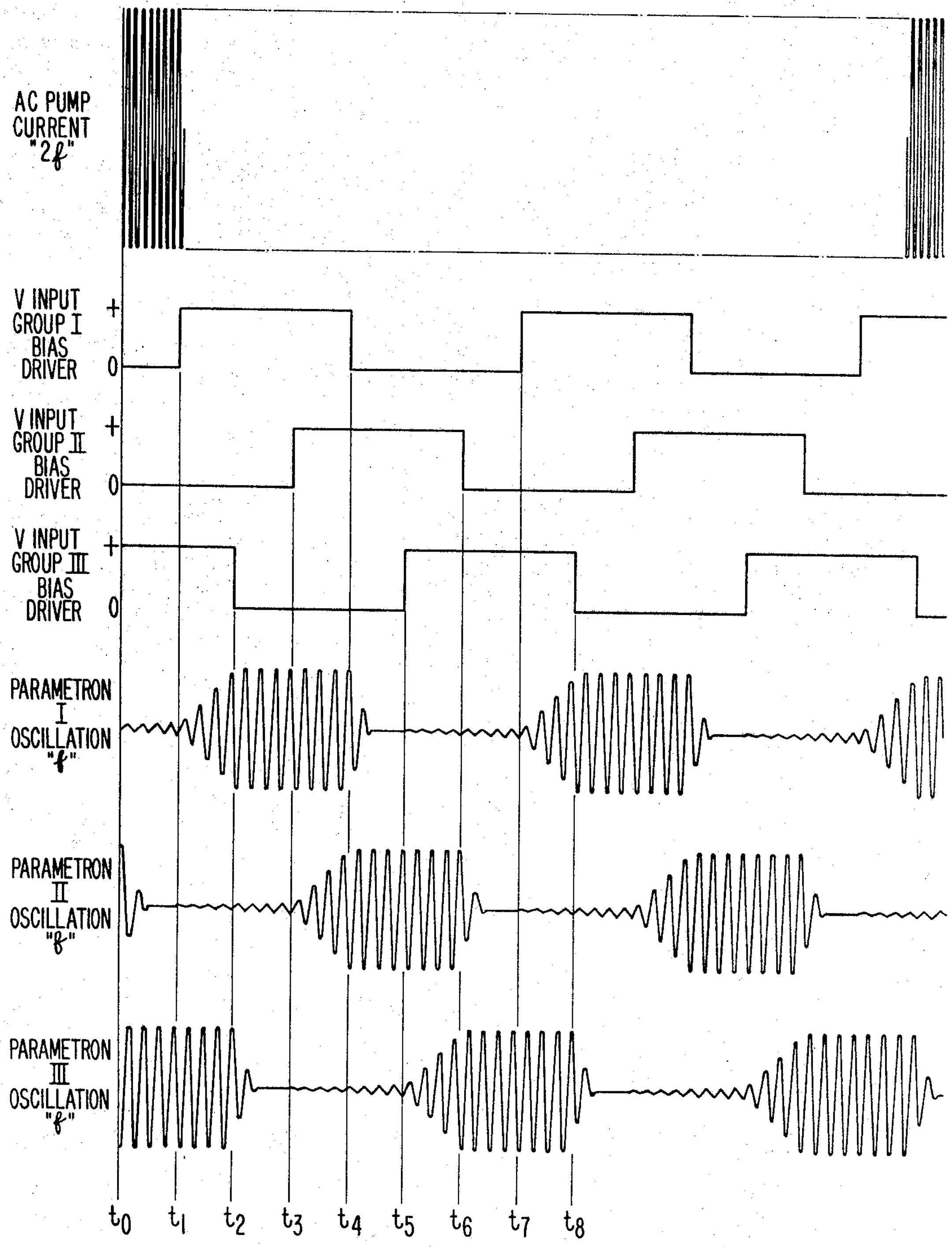
FIG. 4 is a diagram depicting in idealized form and in proper time relationship, various waveforms appearing in the system of FIG. 1.

Considering the overall operation of the arrangement of FIG. 1, general reference should also be made to the remaining FIGS. 2 to 4 inclusive, and in particular to FIG. 4, which illustrates in an idealized manner, the various waveforms encountered in the operation of FIG. 1.

In FIG. 1, the timing for the cyclical excitation of the parametron elements, I, II and III is derived from master clock source 50. Control Signal Source 60, in synchronism with the clock pulses applied thereto, provides V input pulses at the proper times and for suitable durations, to the respective bias drivers, 15, 25 and 35.

At time $t_O$ as shown in FIG. 4, the AC pump power source 40 is activated and is applied continuously to windings $L_2$ and $L_{2'}$, that is, without interruption, throughout the time of operation of the parametron ring. Also commencing at time $t_0$, and continuing until approximately time $t_2$, a set signal source 70 provides an AC current flow of frequency $f$ in winding $L_5$ of coupling transformer $T_3$. It may be assumed that this set signal flows in winding $L_5$ in such a direction as to provide a "seed" oscillation in the resonant circuit of parametron I, which will represent a binary "1".

At time $t_1$, the Control Signal Source 60, pulses the Group I bias driver 15, with V input, and the bias current $I_1$, (FIGS. 2B or 3B) flows through winding $L_3$ and $L_{3'}$. The "seed" oscillation in parametron I illustrated between times $t_0$ and $t_1$, regenerates under the influence of the pump and bias currents, and parametron I goes into full oscillation of the same phase as the "seed" oscillation, between times $t_1$ and $t_4$.

The oscillations appearing across the output terminals 10–10′ of parametron I are coupled by way of transformer $T_{3'}$ to the resonant circuit of parametron II. The oscillation of parametron I thus serves as a nucleus for the oscillation of parametron II. This latter oscillation is illustrated in FIG. 4, at time $t_1$ to $t_3$ under the heading "Parametron II Oscillation." At time $t_3$, V input is applied to thes Group II Bias Driver, 25, from the Control Signal Source 60, and as illustrated between times $t_3$–$t_6$, parametron II is activated and oscillates in the same phase as the signal applied to it by parametron I. The signal from parametron I is present for a short time, $t_3$–$t_4$ after parametron II becomes active to insure that the information is properly transferred. In this manner, the binary "1" stored in parametron I by source 70 has been transferred to parametron II.

At time $t_4$, the V input to the Group I Bias Driver 15 is terminated by the Control Signal Source, and the amplitude of the bias current is no longer at the proper level to sustain oscillations in parametron I. Depending upon whether a bias driven of the type illustrated in FIG. 2A or the one of FIG. 3A is used, the current will either increase to a new level $I_2$ as in FIG. 2B or decrease, as in FIG. 3B.

During the time period $t_3$–$t_6$, the oscillations from parametron II appearing at terminals 20–20′ are applied to parametron III by way of toroid $T_3''$. At $t_5$, parametron III is activated by the flow of bias current through its windings $L_3$–$L_3'$ as provided by Group III Bias Driver, 35. As in the previous transfer of information, parametron III will also oscillate in the same phase as parametron II, and the binary "1" is transferred from III to II. The active period of parametron II terminates at time $t_6$. It is noted that between times $t_6$ and $t_7$, both parametrons I and II are inactive, and no oscillations are observed at terminals 20–20′. The same condition exists for parametron I at time $t_4$–$t_5$, where parametrons I and III are inactive; and for parametron III, at times $t_2$–$t_3$, where parametrons III and II are inactive.

Finally, the oscillations appearing at terminals 30–30′ of parametron III are coupled back to parametron I by transformer $t_3$ during the period $t_5$–$t_8$. At time $t_7$, the Group I Bias Driver, 15, is again pulsed by V input from the Control Signal Source, parametron I commences oscillations, and the cycle is completed. The binary "1" has been transferred from III to I and will continue to circulate indefinitely in the ring as the parametrons are activated in turn by the bias drivers.

It will be apparent from the foregoing description of the invention and its mode of operation that there is provided an improved parametron system in which the subharmonic oscillations are controlled not be modulating the AC pump current, but by varying the level of the bias signal. In addition to the advantages of the present invention as noted hereinbefore, it has been observed that the present method may detune the parametron resonant circuit when the parametron is inactive. This detuning reduces the reverse coupling through inactive parametrons.

It should be understood that modifications of the arrangements described herein may be required to fit particular operating requirements. These will be apparent to those skilled in the art. The invention is not considered limited to the embodiments chosen for purpose of disclosure and covers all changes and modifications which do not constitute departures from the true spirit and scope of this invention. Accordingly, all such variations as are in accord with the principles discussed previously are meant to fall within the scope of the appended claims.

What is claimed is:

1. A parametric system comprising at least one parametron element having a resonant circuit containing a pair of ferrite cores as the nonlinear variable-inductance component and a fixed capacitor, said resonant circuit being tuned to resonance at frequency $f$, a first winding coupled to each of said cores and wound in series opposition to each other, said first windings being adapted to be energized continuously from a source of AC pump power of frequency $2f$, a second winding coupled to each of said cores and wound in series opposition to each other, said second windings being adapted to be energized from a source of pulse bias current having a dual output level, a first output level of said bias current being effective in biasing said ferrite cores to an optimum operating point at a nonlinear portion of their hysteresis loops, thereby causing said resonant circuit to generate subharmonic oscillations at frequency $f$, a second output level of said bias current having a greater magnitude than said first output level and being effective in shifting the operating point established by said first level of bias current to a new point at which said subharmonic oscillations do not occur, and means for controlling the time of application and the output level of said bias currents so as to initiate and subsequently terminate said subharmonic oscillations in accordance with a predetermined cyclical program.

2. A parametric system comprising at least one parametron element including a resonant circuit containing a variable-reactive component, pump input means coupled to said reactive component and adapted to receive continuously from a source thereof an AC pump signal of twice the resonant frequency of said resonant circuit, bias input means coupled to said reactive component and adapted to receive periodically from a source thereof pulses of bias signal, said bias signal having a first and a second amplitude, said first amplitude of bias signal when applied to said bias input means establishing the condition for generating in said resonant circuit subharmonic oscillations of said resonant frequency, said second amplitude bias signal being substantially greater than said first amplitude bias signal and when applied to said bias input means precluding the generation of said oscillations, and means for controlling said source of bias signal whereby said first and second amplitude bias signals respectively are applied to said bias input means for initiating and inhibiting the generation of said oscillations.

3. A system as defined in claim 2 further characterized in that said variable-reactive component is an inductor and said pump and bias signals are respectively in the form of currents, said pump input means and said bias means comprising respectively separate windings coupled to said inductor.

4. A parametric system comprising a plurality of parametrons arranged in groups, each of said parametrons having a resonant circuit containing a variable reactive component, the resonant circuits of said parametrons being coupled to each other whereby the oscillations in one resonant circuit are applied to the succeeding resonant circuit, pump input means coupled to each of said reactive components, an alternating current source for generating a pump signal of twice the resonant frequency of said resonant circuit, said pump signal being applied continuously and in common to all of said pump input means, bias input means coupled to each of said reactive components, a bias driver for each group of parametrons for generating a bias signal, said bias signals being applied conditionally to the bias means of a particular group of parametrons, said bias signal having selectively a first and a second amplitude, said first amplitude bias signal establishing the operating condition for generating in said resonant circuit subharmonic oscillations of said resonant frequency, said second amplitude bias signal being of the same polarity as said first amplitude bias signal but being substantially greater in amplitude thereby precluding the generation of said oscillations, control signal means for directing each of said bias drivers to supply in a cyclical manner a first amplitude bias signal to the bias input means of a first group of parametrons and subsequently to the bias input means of a second group of parameters to establish oscillations in said first and second groups, said control signal means directing the bias driver associated with said first group of parametrons to supply a second amplitude bias signal to said first group at a time following the initiation of oscillations in said second group of parametrons for terminating the oscillations in said first group, the oscillations of said first group serving as a nucleus for the phase of the oscillations of said second group.

5. A system as defined in claim 4 further characterized in that said variable-reactive component is a nonlinear inductance and said pump and bias signals are respectively in the form of currents, said pump input means and said bias input means comprising respectively individual windings coupled to said inductance.

6. A parametric system comprising three parametrons arranged in a ring configuration, each of said parametrons having a resonant circuit containing a nonlinear variable inductance, the resonant circuits of said parametrons being coupled to each other whereby the oscillations in the resonant circuit of a donor parametron are applied to the succeeding resonant circuit of a receiving parametron, a first winding coupled to each said variable inductance, a radio frequency power source for generating a pump current of twice the resonant frequency of said resonant circuit, said pump current being caused to flow continuously through each of said first windings, a second winding coupled to each said variable inductance, a separate current driver associated with each of the three parametrons for generating bias current, said bias current being applied at predetermined times to said second winding of a particular one of said parametrons, said bias current having selectively a first and a second amplitude, said first amplitude bias current establishing the operating condition for generating in said resonant circuit subharmonic oscillations of said resonant frequency, said second amplitude bias current being substantially greater than said first amplitude bias current and being capable of magnetically saturating the core material of said parametrons thereby precluding the generation of said oscillations, control signal means for directing each of said current drivers to supply in turn a first amplitude bias current to said second winding of each of said parametrons in an overlapping manner such that the oscillations of the receiving parametron are established before the interruption of the oscillations in the donor parametron, said control signal means directing each of said current drivers to supply in turn second amplitude bias current to said second winding of each of said parametrons to terminate the oscillations of said parametrons.

7. A system as defined in claim 6 including a master clock source for applying synchronizing signals to said control signal means, whereby said parametrons are excited in a cyclical manner.

8. A system as defined in claim 6 wherein said current driver comprises a plurality of transistors, a first of said transistors being adapted to be pulsed from said control signal means and being driven to conduction thereby, a second and a third transistor connected in a cascade arrangement, the state of conduction of said second and third transistors being controlled by that of said first transistor and being the inverse thereof; a series circuit comprising a source of potential, said second winding means, a first impedance and the parallel combination of said second and third transistors with said second impedance; the conduction of said first transistor preventing the conduction of said second and third transistors whereby said first amplitude bias current flows from said source of potential through said second winding means and said first and second impedances, the nonconduction of said first transistor resulting in the conduction of said second and third transistors whereby said second impedance is effectively short-circuited and said second amplitude bias current flows from said source of potential, through said second winding means, said first impedance, and said second and third transistors.

References Cited

UNITED STATES PATENTS

| | | | |
|---|---|---|---|
| 3,108,195 | 10/1963 | Wu | 307—88 |
| 3,132,258 | 5/1964 | Gaertner | 307—88 |
| 2,948,818 | 8/1960 | Goto. | |
| 2,957,087 | 10/1960 | Goto. | |
| 3,071,696 | 1/1963 | Livingstone. | |

STANLEY M. URYNOWICZ, *Primary Examiner.*